(12) United States Patent  (10) Patent No.: US 8,072,914 B2
Brisebois et al.  (45) Date of Patent: Dec. 6, 2011

(54) LOCATION SURVEY FOR POWER CALIBRATION IN A FEMTO CELL

(75) Inventors: Arthur Richard Brisebois, Cumming, GA (US); Kurt Donald Huber, Coral Springs, FL (US)

(73) Assignee: AT&T Mobility II LLC, Atlanta, GA (US)

( * ) Notice: Subject to any disclaimer, the term of this patent is extended or adjusted under 35 U.S.C. 154(b) by 539 days.

(21) Appl. No.: 12/328,573

(22) Filed: Dec. 4, 2008

(65) Prior Publication Data

US 2009/0279519 A1  Nov. 12, 2009

Related U.S. Application Data

(60) Provisional application No. 61/051,586, filed on May 8, 2008.

(51) Int. Cl.
| | |
|---|---|
| G08C 17/00 | (2006.01) |
| H04B 7/185 | (2006.01) |
| H04B 7/00 | (2006.01) |
| H04W 4/00 | (2009.01) |
| H04W 36/00 | (2009.01) |

(52) U.S. Cl. ........ 370/311; 370/318; 370/332; 370/338; 455/444; 455/522

(58) Field of Classification Search .......... 370/310–350; 455/88, 104, 403, 422.1, 434, 444, 456.1, 455/522

See application file for complete search history.

(56) References Cited

U.S. PATENT DOCUMENTS

| | | | | |
|---|---|---|---|---|
| 7,855,977 | B2 * | 12/2010 | Morrison et al. | 370/252 |
| 7,974,653 | B1 * | 7/2011 | Yenney et al. | 455/522 |
| 2009/0296635 | A1 * | 12/2009 | Hui et al. | 370/328 |
| 2009/0310561 | A1 * | 12/2009 | Grob et al. | 370/331 |
| 2009/0312017 | A1 * | 12/2009 | Grob et al. | 455/434 |
| 2010/0061317 | A1 * | 3/2010 | Gorokhov et al. | 370/329 |
| 2010/0273471 | A1 * | 10/2010 | Meshkati et al. | 455/422.1 |

* cited by examiner

*Primary Examiner* — Tri H Phan

(57) ABSTRACT

System(s) and method(s) are provided to survey a confined area serviced by femto cell for power calibration. Building survey facilitates calibration of femto cell power to suit actual coverage conditions within the building. A femto access point (AP) is set to "calibration mode" while a "calibration call" is effected (e.g., by a subscriber) throughout the intended in-building coverage area. Wireless signal strength for macro and femto coverage is measured and employed to establish an optimal femto AP power. Building survey for power calibration affects operation of the both a building-based AP serving the femto cell and wireless devices, and enhances subscriber experience.

45 Claims, 11 Drawing Sheets

LOCATION SURVEY FOR POWER CALIBRATION IN A FEMTO CELL

CROSS-REFERENCE TO RELATED APPLICATIONS

This application claims the benefit of U.S. Provisional Application Ser. No. 61/051,586 filed on May 8, 2008, entitled "LOCATION SURVEY FOR POWER CALIBRATION IN A FEMTO CELL." The entirety of this provisional application is incorporated herein by reference.

TECHNICAL FIELD

The subject innovation relates to wireless communications and, more particularly, to power management based on a location survey to provide adequate femto cell or other in-building-based wireless service to a specific confined coverage area.

BACKGROUND

Femto cells—building-based wireless access points interfaced with a wired broadband network—are generally deployed to improve indoor wireless coverage provided by a wireless network operator. Femto cells typically operate in licensed portions of the electromagnetic spectrum, and generally offer plug-and-play installation; e.g., automatic configuration of femto access point. Improved indoor coverage includes stronger signal and improved reception (e.g., voice or data), ease of session or call initiation and session or call retention as well. Coverage improvements via femto cells can also mitigate customer attrition.

Coverage of a femto cell, or femto AP, is intended to be confined within the bounds of an indoor compound (e.g., a building with multiple floors), in order to mitigate interference among mobile stations covered by a macro cell and terminals covered by the femto AP. In addition, confined coverage can reduce cross-talk among terminals serviced by disparate, neighboring femto cells as well. Conventional femto cell power features generally employ relatively inaccurate information sources and mechanisms to identify and set an optimal power transmission power that ensures quality of service within a confined coverage area. For instance, one such mechanism is to specify a building material and number of floors in order to ascertain path loss. As another example, a power adjustment mechanism can rely on measuring the macro network signal strength to assess an adequate transmission power in a femto cell. In the foregoing power management examples, however, resulting transmission power typically (a) fails to adequately cover all areas within a building, or (b) leads to excessive outdoor coverage, interference and signaling activity, with ensuing poor quality of service and reduced wireless device battery life.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject innovation provides system(s) and method(s) to survey a confined area serviced by femto cell for power calibration. Building survey facilitates calibration of femto cell power to suit actual coverage conditions within the building. A femto access point (AP) is set to "calibration mode" while a "calibration call" is effected (e.g., by a subscriber) throughout the intended in-building coverage area. Wireless signal strength for macro and femto coverage is measured and analyzed to establish an optimal femto AP power. Building survey for power calibration described herein advantageously affects operation of the both a building-based AP serving the femto cell and wireless devices, and enhances subscriber experience. The following are illustrative, and not limiting, advantages afforded by utilization and implementation of system(s) and method(s) described herein. Service quality. Identification of femto AP power based on a building survey can deliver predictably adequate service quality throughout the building, thus ensuring a rich subscriber experience. Traffic capture. Through optimization of femto AP power based on a building survey, indoor calls can be served on the femto, rather than macro, network, thus ensuring maximum return on investment for a femto cell deployment. Interference and battery life. Ensuring utilization of a minimum necessary power the femto AP is less likely to generate interference or create/capture unnecessary signaling traffic from outside a covered building, or confined coverage area. In addition, minimum power consistent with an adequate coverage can reduce the number of outside users that attempt to access the femto AP via unnecessary transmitter activity, thus ensuring optimal battery life of wireless devices served by the femto cell. Furthermore, measurements effected as part of calibration call within location survey facilitates determination of level of artificial interference sufficient to drive scanning of carrier frequency(ies) utilized in femto AP while maintaining macro service operation for subscriber unauthorized for femto coverage.

Various aspects, features or advantages described herein, while illustrated through femto access point(s) and associated femto coverage, can be exploited for home access point(s) that provide wireless coverage through substantially any, or any, disparate telecommunication technologies, such as for example Wi-Fi (wireless fidelity). Aspects, features, or advantages of the subject innovation described the subject specification can be exploited in substantially any wireless communication technology, in connection with access point power management. For instance, Wi-Fi, Worldwide Interoperability for Microwave Access (WiMAX), Enhanced GPRS or Enhanced Data Rates for GSM (EDGE), 3rd Generation Partnership Project (3GPP) Long Term Evolution (LTE), 3rd Generation Partnership Project 2 (3GPP2) Ultra Mobile Broadband (UMB), 3GPP Universal Mobile Telecommunication System (UMTS), High-Speed Packet Access, or Zigbee. Additionally, substantially all aspects of the subject innovation as disclosed in the subject specification can be exploited in legacy telecommunication technologies such as GSM.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
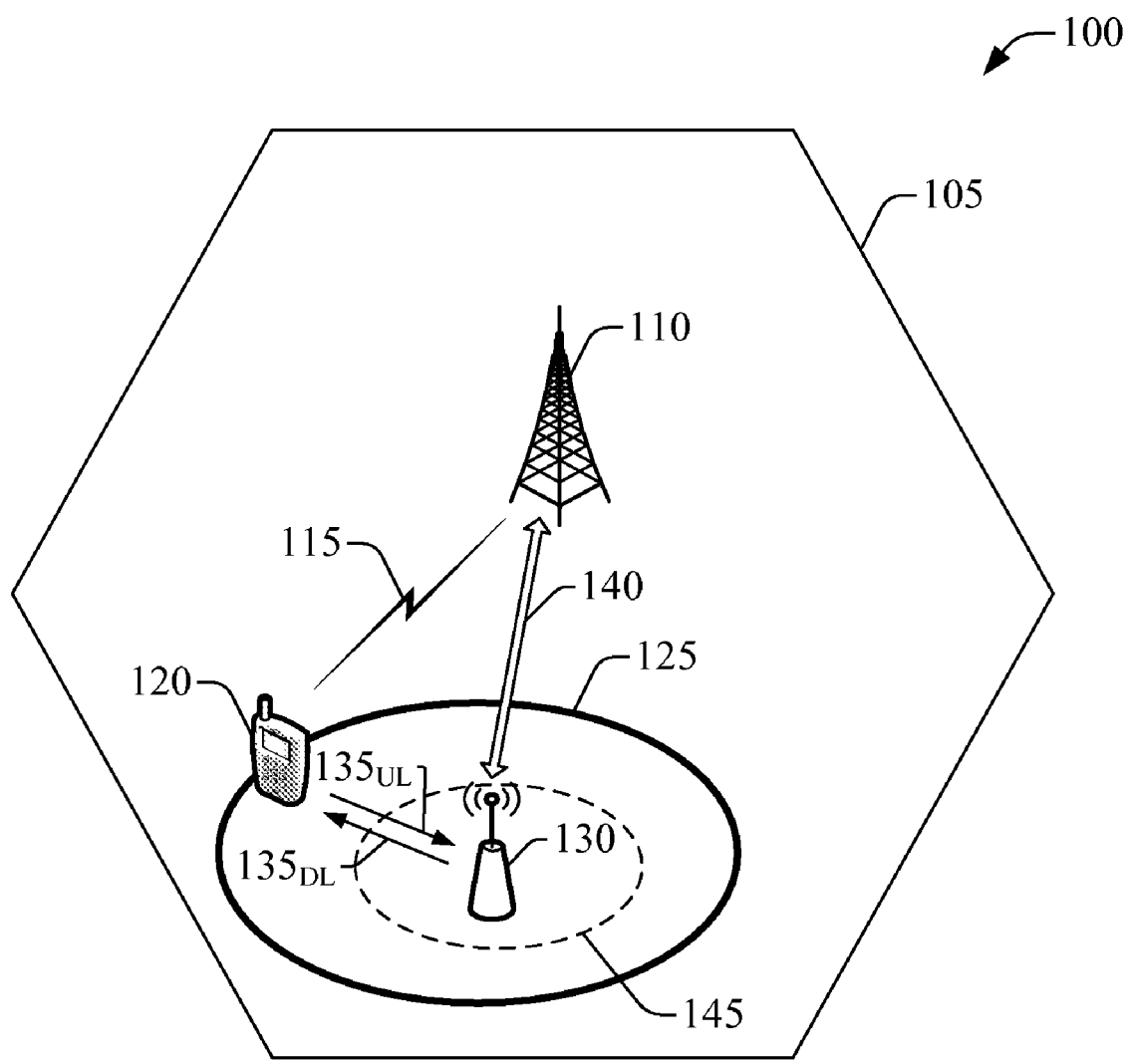
FIG. 1 illustrates an illustrative schematic deployment of a macro cell and a femto cell for wireless coverage.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Furthermore, terms like "user equipment," "mobile station," "mobile," subscriber station," "mobile subscriber," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home access point," "home Node B," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Referring to the drawings, FIG. 1 illustrates a schematic wireless environment (e.g., a network) 100 in which a femto cell can exploits various aspects described in the subject specification. In wireless environment 100, area 105 represents a coverage macro cell which is served by base station 110. Macro coverage is generally intended for outdoors locations for servicing mobile wireless devices, like UE 120, and such coverage is achieved via a wireless link 115. In an aspect, UE 120 can be a third generation partnership project (3GPP) Universal Mobile Telecommunication System (UMTS) mobile phone. Mobile subscriber 120 communicates with femto AP 130 through a downlink $135_{DL}$ and uplink $135_{UL}$.

Within macro coverage cell 105, a femto cell, served by a femto access point 130, can be deployed. A femto cell typically covers an area 125 that is determined, at least in part, by transmission power allocated to femto AP 130, path loss, shadowing, and so forth. Femto cell coverage area typically is spanned by a coverage radius that ranges from 20 to 50 meters. Confined coverage area 145 is generally associated with an indoors area, or a building, which can typically span about 5000 sq. ft. Generally, femto AP 130 typically services a few (e.g., 1-9) wireless devices (e.g., subscriber station 120) within confined coverage area 145. Coverage of such wireless devices according to predetermined quality of service standards, e.g., minimum packet rate, guaranteed packet rate, traffic priority, etc., offered by a femto cell operator to a subscriber generally is dictated at least in part by power allocation to femto AP 130. In addition, in order to ensure adequate quality of service (QoS), e.g., QoS that meets offered/agree standards of service; power allocation is to ensure femto cell service is limited to coverage within confined area 145. An example system that comprises a femto AP 130 and a user equipment 120 and exploits femto service survey within confined are 145 (e.g., a building) for calibration of a femto AP power is discussed next.

In an aspect, femto AP 130 can integrate seamlessly with substantially any packet switched (PS)-based and circuit switched (CS)-based network; for instance, femto AP 130 can integrate into an existing 3GPP Core via conventional interfaces like Iu-CS, Iu-PS, Gi, Gn. In another aspect, femto AP 130 can exploit high-speed downlink packet access in order to accomplish substantive bitrates. In yet another aspect, femto AP 130 has a LAC (location area code) and RAC (routing area code) that is different than the underlying macro network sector or cell. These LAC and RAC are used to identify subscriber station location for a variety of reasons, most notably to direct incoming voice and data traffic to the appropriate paging transmitters.

In a wireless network environment that includes femto cells, e.g., 125, and macro cells, e.g., cell 105, as a subscriber station, e.g., UE 120, leaves macro coverage (e.g., cell 105) and enters femto coverage (e.g., area 125), as illustrated in environment 100, UE $120_A$ attempts to attach to the femto AP 130 through transmission and reception of attachment signaling, effected via wireless downlink (DL) $135_{DL}$ and wireless uplink (UL) $135_{UL}$; in an aspect, the attachment signaling can include a Location Area Update (LAU) and/or Routing Area Update (RAU). Attachment attempts are a part of procedures to ensure mobility, so voice calls and sessions can be established and received even after a macro-to-femto transition or vice versa. It is to be noted that UE 120 can be employed seamlessly after either of the foregoing transitions. Femto networks are also designed to serve stationary or slow-moving traffic with reduced signaling loads compared to macro networks. A femto service provider (e.g., an entity that commercializes, deploys, and/or utilizes femto access point 130) is therefore inclined to minimize unnecessary LAU/RAU signaling activity at substantially any opportunity to do so, and through substantially any available means. It is to be noted that substantially any mitigation of unnecessary attachment signaling/control is advantageous for femto cell operation. Conversely, if not successful, UE 120 is generally commanded (through a variety of communication means) to select another LAC/RAC or enter "emergency calls only" mode. It is to be appreciated that this attempt and handling process can occupy significant UE battery, and femto AP capacity and signaling resources as well.

When an attachment attempt is successful, UE 120 is allowed on femto cell 125 and incoming voice and data traffic are paged and routed to the subscriber through the femto AP 130, through utilization of LAC and RAC associated therewith. It is to be noted also that data traffic is typically routed through a backhaul broadband wired network backbone 140 (e.g., optical fiber backbone; twisted-pair line; T1/E1 phone line; digital subscriber line (DSL), either asynchronous or synchronous; coaxial cable . . . ). To this end, femto AP 130 is connected to the broadband backhaul network backbone 140 via a broadband modem (not shown). It is to be noted that as a femto AP 130 generally relies on a backhaul network backbone 140 for routing and paging, and for packet communication, substantially any quality of service (QoS) can be handled for heterogeneous packetized traffic. Namely, packet flows established for wireless devices (such as terminal 120) served by femto AP 130, and for devices served through the backhaul network pipe 140. It is to be noted that to ensure a positive subscriber experience, or perception, it is important for femto AP 130 to maintain a high level of throughput for traffic (e.g., voice and data) utilized on a mobile device for one or more subscribers while in the presence of external, additional packetized, or broadband, traffic associated with applications (web browsing, data transfer (e.g., content upload), and the like) executed in devices within the femto coverage area (e.g., either area 125 or area 145).

Figure 2:
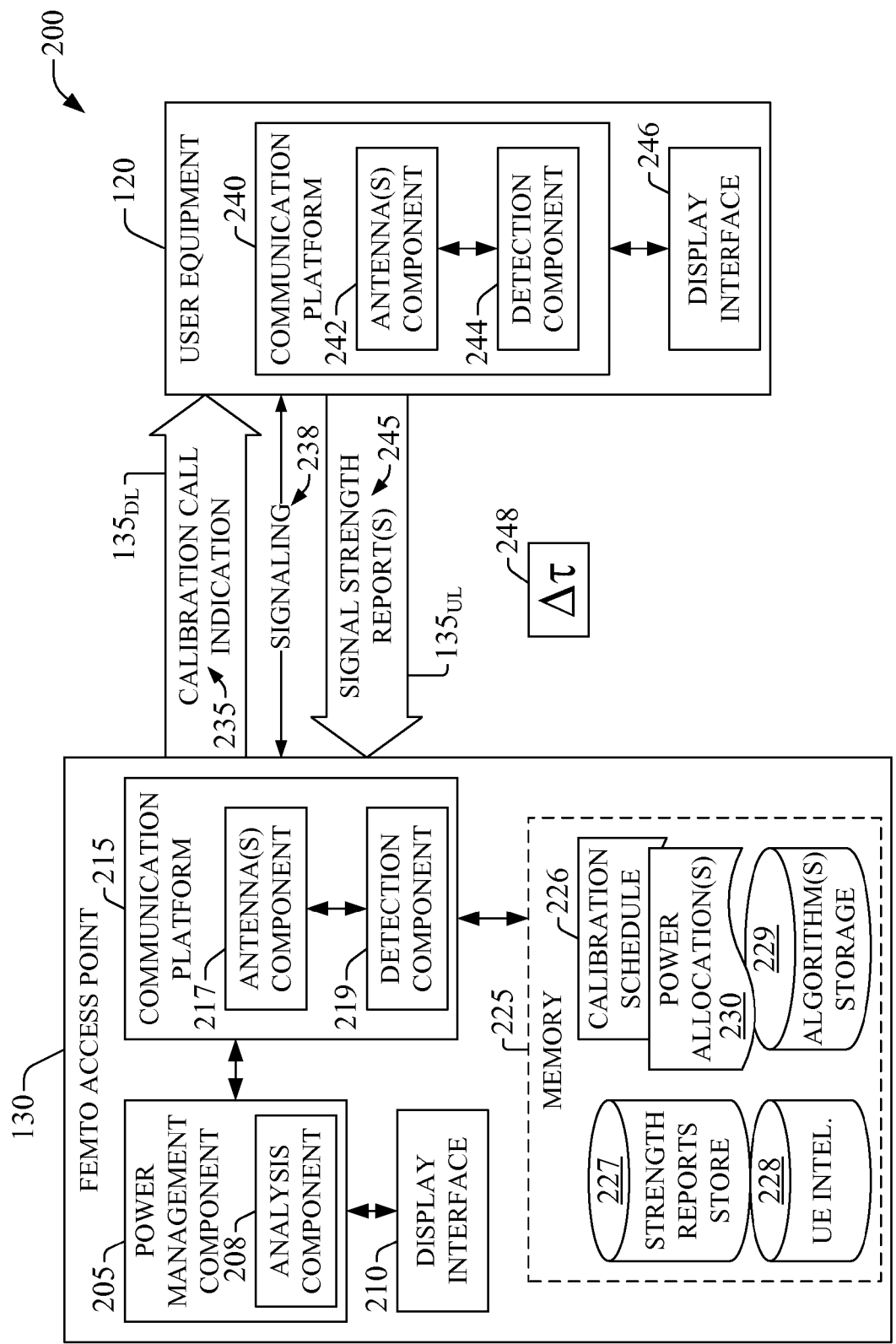
FIG. 2 is a block diagram of an example system that facilitates femto cell power calibration through an in-building survey in accordance with aspects described in the subject specification.

FIG. 2 is a block diagram of an example system 200 that facilitates femto AP transmission power calibration through an in-building location survey of signal strength for femto and macro coverage in accordance with aspects described in the subject specification. Femto access point 130 includes a power management component 205 that can configure femto AP 130 in a "calibration mode" of operation. In an aspect, upon an initial power up, femto AP 130 is started in calibration mode via a boot procedure (retained, for example, in algorithm(s) storage 229) of power management component 205. It is noted that power management component 205 can configure femto AP 130 in calibration mode of operation based at least in part on at least one of an initial, e.g., subsequent to or concomitant with provisioning of femto AP 130; a predetermined schedule (e.g., calibration schedule 226); or an event based instance. Event-based instance(s) can include femto AP displacement within a coverage area (e.g., area 125), or subscriber actuation.

It is further noted that calibration mode of operation also can be initiated via an external interaction (e.g., a button actuation or press) of an agent (e.g., a subscriber) with femto AP 130. Display interface 210 (e.g., light emitting diode (LED) lights or a message in a liquid crystal display (LCD) screen) can convey the calibration mode of operation via visual or aural indicia. At least two advantages to convey the calibration mode of operation through visual or aural indicia is to alert a subscriber that is to place the calibration call, and reveal proper operation of calibration mode of operation. While in calibration mode, power management component 205 allocates high transmission power to femto AP 130 and retains a high power condition to enable the calibration call. It is noted that high power can be determined with respect to a regulated or permitted maximum level of power for radio frequency (RF) radiation associated with a telecommunication apparatus; in an aspect, analysis component 208 can make such determination. High power also can be a power level that is utilized to serve calls in high path loss situations, with the power level within the maximum regulated power level. This calibration state or mode remains a predetermined time interval Δτ 248 which facilitates UE 120 to place the calibration call in response to the calibration call indication 235. The time interval can be configured by a network provider. In an aspect, Δτ 248 can be configured by a network operator or adjusted upon request from a subscriber that pursues calibration of the transmission power associated with femto AP 130. When no calibration call is effected and Δτ 248 elapses, power management component 205 can exit calibration mode, e.g., it can shut down femto AP 130 or return it to normal operation; analysis component 208 can determine Δτ 248 elapsed without a calibration call placed.

To facilitate a calibration call, or power calibration call, communication platform 217 via antenna(s) component 217 and detection component 210 conveys via DL $135_{DL}$ a calibration call, or power calibration call, indication 235, which can be embodied, for example, in a communication delivered through at least one of short message service (SMS), multimedia message service (MMS), instant messaging (IM), or email. It is noted that calibration call indication 235 can be delivered as a set of one or more bits conveyed via one or more broadband channels, one or more in-band management frames, or within headers of one or more packets; as an example illustration, calibration call indication 235 can be a management frame with Q symbols, with Q a positive integer, a signaling packet with a P-bit word, or substantially any other signaling. Femto AP 130, through communication platform 215 for example, enables a call from the predetermined "owner" MSISDN (mobile station integrated services digital network number) or any mobile device unique identifier such as international mobile subscriber identity(ies) (IMSIs), or any suitable code like electronic serial numbers (ESNs) or subscriber identity module (SIM) credentials.

In an aspect, via calibration call indication 235 and facilitated, e.g., through a display or an audio interface in UE 120 such as display interface 246, a subscriber that operates UE 120 is instructed to call a predetermined number and carry the call, through displacement(s), to substantially all locations within a building that is to be served or covered by femto AP 130. Femto AP 130, while it serves such calibration call, also can instruct, via power management component 205 and signaling 238, UE 120 to measure and report the strength of femto network and macro network signals. User equipment 120 can measure signal strength and report associated channel conditions (e.g., signal-to-noise ratio (SNR) such as the ratio of received pilot or reference signal energy over total received energy ($E_c/I_o$); signal-to-noise-and-interference ratio (SINR); carrier over interference (C/I); reference signal code power (RSCP) in UMTS system or equivalent(s) in other telecommunication systems; and the like, for femto and macro signals) through communication platform 240, which possesses substantially the same or the same functionality and components as communication platform 215; user equipment 120 conveys signal strength report(s) 245 over uplink 135$_{UL}$. In an aspect, detection component 244 can effect the measurements via femto and macro signal received via antenna(s) component 242. In an aspect, measurements of macro signal strength can include measurement of macro sectors in which femto AP 130 is deployed and neighbor sectors, in which UE 120 can otherwise camp on prior to acquiring femto AP 130. It is noted that such macro signal measurements can provide an indication, while UE 120 is in idle mode on macro, whether (i) UE 120 may scan one or more femto AP 130 carrier frequencies naturally, such as in a scenario in which macro Ec/Io, or any other signal strength metric, is poor, or (ii) if artificial interference is necessary to drive or force UE 120 to scan the one or more femto AP 130 carrier frequencies when a subscriber that operates UE 120 arrives at home served through the femto AP 130. It is further noted that, when UE 120 is driven through artificial interference, e.g., a jamming interference, to scan femto AP 130 carrier frequency(ies), location survey measurements that are a part of a power calibration call can provide an additional level of accuracy to the determination of jamming power, to ensure that the generated jamming interference is sufficient to trigger scanning but it fails to prevent successful calls (e.g., voice or data sessions) for unauthorized mobile devices (e.g., UE 120) via the macro network in the vicinity of femto AP 130. Received signal strength report(s) can be stored in strength reports store 227, which can reside within femto AP 130, or be at least in part external to femto AP 130 (e.g., strength reports store 227 can reside in femto gateway node(s), or external memory element such as in a server functionally coupled to femto AP 130).

In addition, femto AP 130 also can measure uplink signal strength from UE 120 towards the femto AP 130 receiver, which can be part of antenna(s) component 219, which facilitates reception of wireless signal; such measurements are enabled and/or facilitated by communication platform 215. Report(s) on UL signal strength from UE 120 towards femto AP 130 also can be retained in strength reports store 227.

Subscriber who operates UE 120 is instructed, via a disparate calibration call indication 235 or through the original calibration call indication 235, to end the calibration call after all locations within the building to be covered through femto AP 130 have been visited. Power management component 205 can facilitate femto AP 130 to exit "calibration mode" after the calibration call is released by the subscriber that operates UE 120.

When a calibration call is released, femto AP 130 via power management component 205 analyzes, via analysis component 208, received signal strength reports 245 in order to identify a maximum and a minimum path loss among itself and substantially all, or all, surveyed locations within a building to be covered by the femto AP 130. In an aspect, to determine path losses, e.g., through computation, power management component 205 via analysis component 208 can exploit, at least in part, RF radiation scattering and propagation model(s) and algorithm(s) retained in algorithm(s) storage 229. Additionally, power management component 205, via analysis component 208, can combine known UE sensitivity standards, which can be retained in UE intelligence 228, with the determined (e.g., computed) path loss values to establish a power allocation, or power setting, that can ensure adequate service throughout the building to be covered through femto AP 130. Such power allocation is herein termed $P_{Quality}$, and can be retained in memory element power allocation(s) 230. Moreover, femto AP 130, via power management component 205, can combine available (e.g., computed) path loss values with signal strength reports (e.g., stored in strength reports store 227) from macro network signal measurements performed by UE 120 in order to identify a power allocation adequate to capture indoor traffic on femto cell instead of macro cell; such power allocation is termed herein $P_{Capture}$, and can be retained in memory element power allocation(s) 230. It should be appreciated that one or more other characteristic values of transmission power allocation(s) can be determined as described above. A power allocation, or effective power allocation, effected by power management component 205 can be at least the maximum, minimum, or weighted average of $P_{Quality}$ and $P_{Capture}$ values.

A processor (not shown) can be configured to confer, and confer, at least in part, functionality to components within femto AP 130, or execute component therein. To that end, the processor can execute code instructions or program modules stored in a memory (e.g., memory 225) functionally coupled to femto AP 130, and exploit related data structures (e.g., objects, classes).

It should be appreciated that while example system 200, and other example system(s) described hereinafter, is illustrated through femto access point(s) and associated femto coverage, aspects and features described herein also can be exploited for home access point(s) that provide wireless coverage through substantially any, or any, disparate telecommunication technologies, such as for example Wi-Fi (wireless fidelity).

Figure 3:
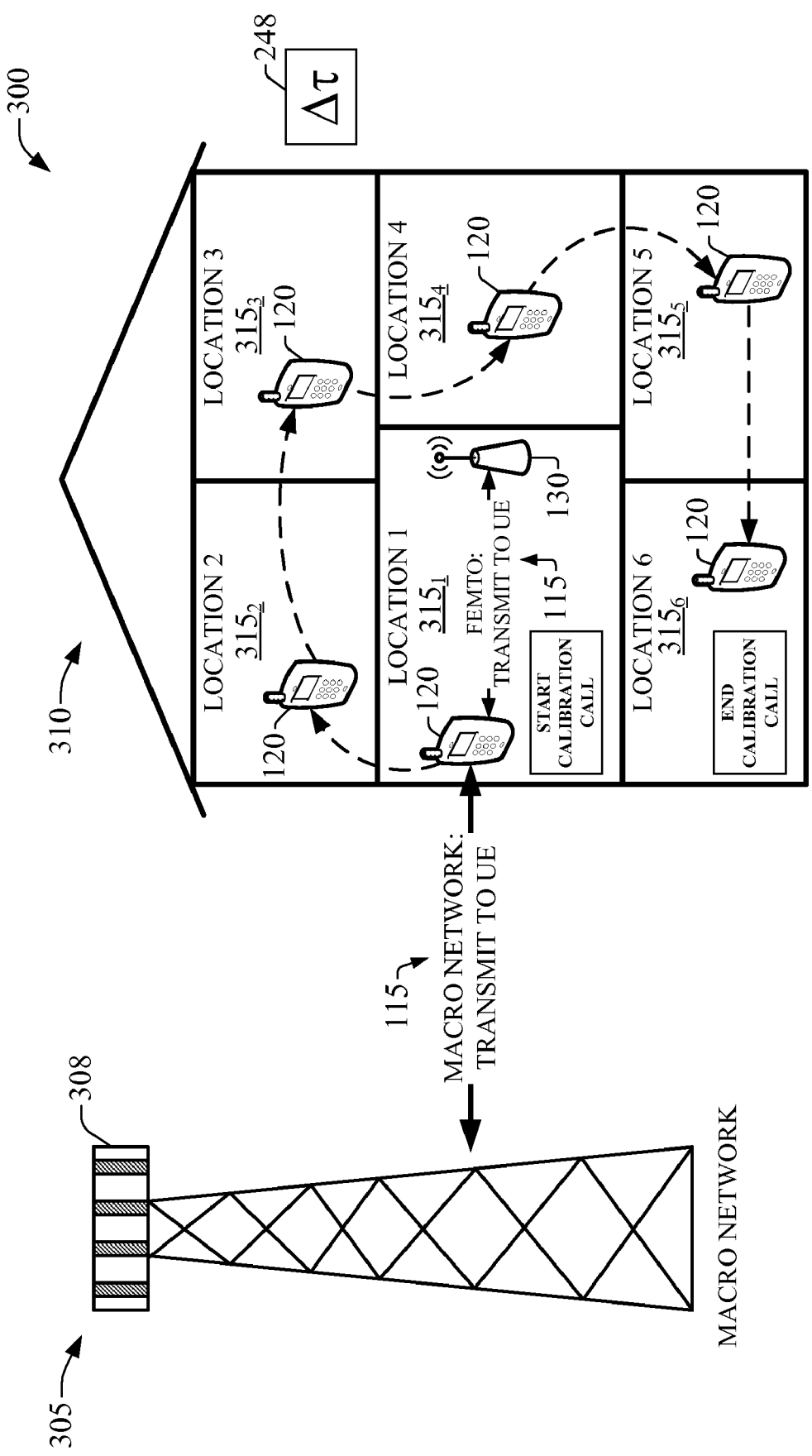
FIG. 3 illustrates an example embodiment of an in-building femto cell that exploits or performs a location survey power calibration to set an optimal transmission power for a serving femto AP through handset signal strength measurements in accordance with aspects described herein.

FIG. 3 illustrates an example embodiment 300 of an in-building femto cell, served through femto AP 130, that exploits or performs a location survey power calibration to set an optimal transmission power for the femto AP 130 through handset signal strength measurements in accordance with aspects described herein. A macro network is illustrated with a base station 305, which can utilize multiple antennas 308 to convey and receive signal(s). Macro network 305 indicates UE 120 to initiate a calibration call, or power calibration call, as described supra. Power calibration call employs a dedicated number which can be administered through a management component within a femto network platform (e.g., at least a portion of a core network such as a femto gateway node or femto server(s)). The UE 120 thus initiates at location 315$_1$ (see, "start calibration call" indication) a location survey of femto and macro radio link strength or channel signal strength in a set of locations $315_1$-$315_6$, e.g., rooms within a building covered via femto AP 130, through displacements (illustrated as dashed arrows) of UE 120 from one location to a next location within building 310 which in an aspect embodies, for example, a confined area of femto coverage 145).

In example embodiment 300, location survey procedure ends at location $315_6$, wherein the calibration call is ended as illustrated via "end calibration call" in FIG. 3; throughout the location survey, UE 120 conveys wireless link signal strength to femto AP 130. Femto access point 130 then determines an optimal transmission power allocation, as dictated by power allocation algorithm(s) (e.g., retained in memory element algorithm(s) storage 229) and discussed above in connection with example system 200. It is noted that building survey of femto and macro wireless link strength provides an automated functionality to calibrate transmission power of femto AP 130 in order to suit one or more actual coverage conditions in building 310; for example, coverage conditions include at least one of building material(s); radio frequency radiation scattering and associated path loss; plan footprint features such as windows, interior walls, doors, basement(s), or low or high ceilings; exterior construction aspects such as proximity of neighboring properties, or shadowing originated thereof; landscaping features such as mature trees or lack thereof, or the like.

In addition, in an aspect of the subject innovation, location survey of macro and in-building radio signal strength can be exploited to determine and adjust, at least in part, a shape or contour (e.g., oblate area) of the confined coverage area provided through femto access point 130, or substantially any home access point that provides wireless coverage within building 310. In addition to adjusting transmission power from femto AP 130 to establish extent of confined coverage area, orientation of two or more antennas in femto AP 130, wherein the two or more antennas can be part of antenna(s) component 217, can be adapted so as to radiate signal in accordance with one or more patterns that can facilitate, at least in part, adjustment of shape or contour of confined coverage area. It is to be appreciated that two or more antennas in femto AP 130 can be allocated disparate transmission power in order to increase control of adjustment of shape or contour of confined coverage area served through femto AP 130, or substantially any home access point that provides wireless coverage within building 310. It is to be further appreciated that aspects of power management and antenna accommodation for adjustment of coverage area shape or contour also can be controlled, at least in part, through analysis component 208.

Figure 4:
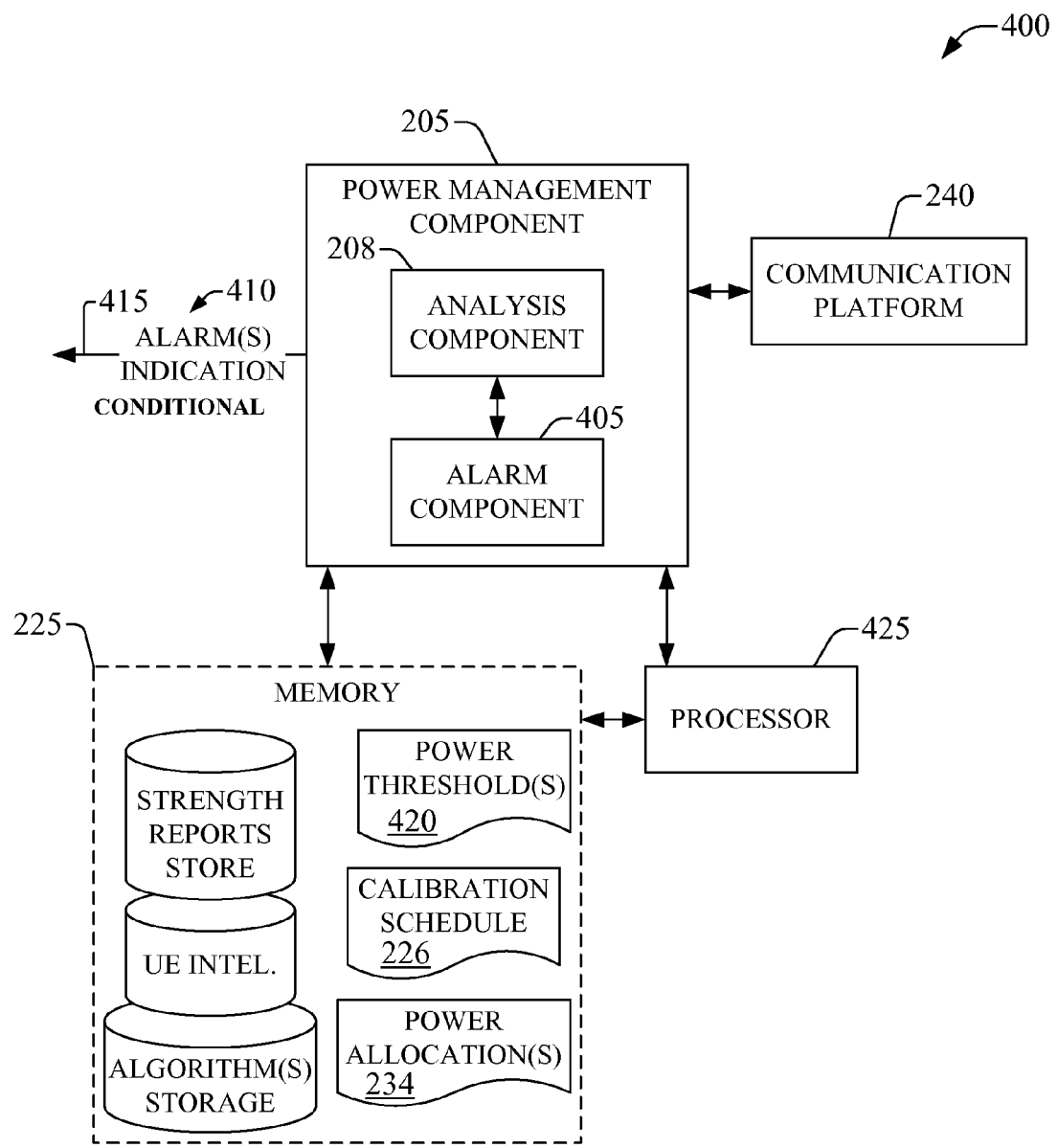
FIG. 4 is a block diagram of an example system that facilitates to trigger an alarm when difference two or more determined characteristic power allocation values is above threshold in accordance with aspects described herein.

FIG. 4 is a block diagram of an example system 400 that facilitates to trigger an alarm when difference two or more determined (e.g., computed) characteristic power allocation values is above threshold in accordance with aspects described herein. It is noted that components with like numerals as in example system(s) or embodiment(s) described above have the same functionality as previously described. In example system 400, power management component 205 includes an alarm component 405, which triggers alarm(s) and conveys alarm(s) indication 410 when determined characteristics transmission power values such as $P_{Quality}$ and $P_{Capture}$ yield substantially different power allocations; as described above, determination of characteristics transmission power values can be accomplished via analysis component 208. In an aspect, to assess differences among determined characteristics transmission power allocations, analysis component 208 can utilize power threshold(s) 420, which can be configured by a network operator, or autonomously by power management component; autonomous determination can be based at least in part on machine learning techniques such as Hidden Markov Models (HMMs) and related prototypical dependency models; general probabilistic graphical models, such as Dempster-Shafer networks and Bayesian networks like those created by structure search using a Bayesian model score or approximation can also be utilized; linear classifiers, such as support vector machines (SVMs), non-linear classifiers like methods referred to as "neural network" methodologies, fuzzy logic methodologies; game theoretic models (e.g., game trees, game matrices, pure and mixed strategies, utility algorithms, Nash equilibria, evolutionary game theory, etc.) and other approaches that perform data fusion, Alarm(s) indication 410 can be delivered through link 415 which can be embodied in wireless link $135_{DL}$ when alarm is delivered to UE 120 as part of signaling 238, backhaul link 140 when alarm(s) indication is conveyed to a mobile network platform (e.g., at least a part of a core network), or a network link when alarm(s) indication is conveyed to a component such as display component 210. Alarm indication(s) can be embodied in at least one of a visual, aural, or physical (e.g., vibration) indicia; a short message service (SMS) communication, a multimedia message service (MMS) communication; or a customer-service based voice communication when the alarm(s) indication 410 is delivered through a display interface in at least one of a femto AP that undergoes calibration or a UE that effects the calibration call. Substantially the same, or the same, embodiments for alarm(s) indication 410 are possible when the alarm(s) indication 410 is conveyed to a network administrator or agent through a network management component.

Processor 425 can be configured to confer, and can confer, at least in part, functionality to components within power management component 205, or execute component(s) therein. To at least that end, processor 425 can execute code instructions or program modules stored in a memory (e.g., memory 225) functionally coupled to femto AP 130, and exploit related data structures (e.g., objects, classes).

In view of the example systems described above, example methods that can be implemented in accordance with the disclosed subject matter can be better appreciated with reference to flowcharts in FIGS. 5-8. Such flowcharts convey, at least in part, example methods for allocating power to a femto access point based on an in-building survey of macro and femto wireless signals according to aspects described herein. For purposes of simplicity of explanation, example methods are presented and described as a series of acts; however, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it is noted that one or more of the example methods described herein can be implemented or exploited in conjunction, as a part of a single compound method, or as part of a method that includes two or more entities that enact it, such as in a flow call or interaction diagram. Furthermore, it should be further appreciated that the methodologies disclosed hereinafter and throughout this specification are capable of being stored on an article of manufacture to facilitate transporting and transferring such methodologies to computers for execution by a processor or for storage in a memory.

Figure 5:
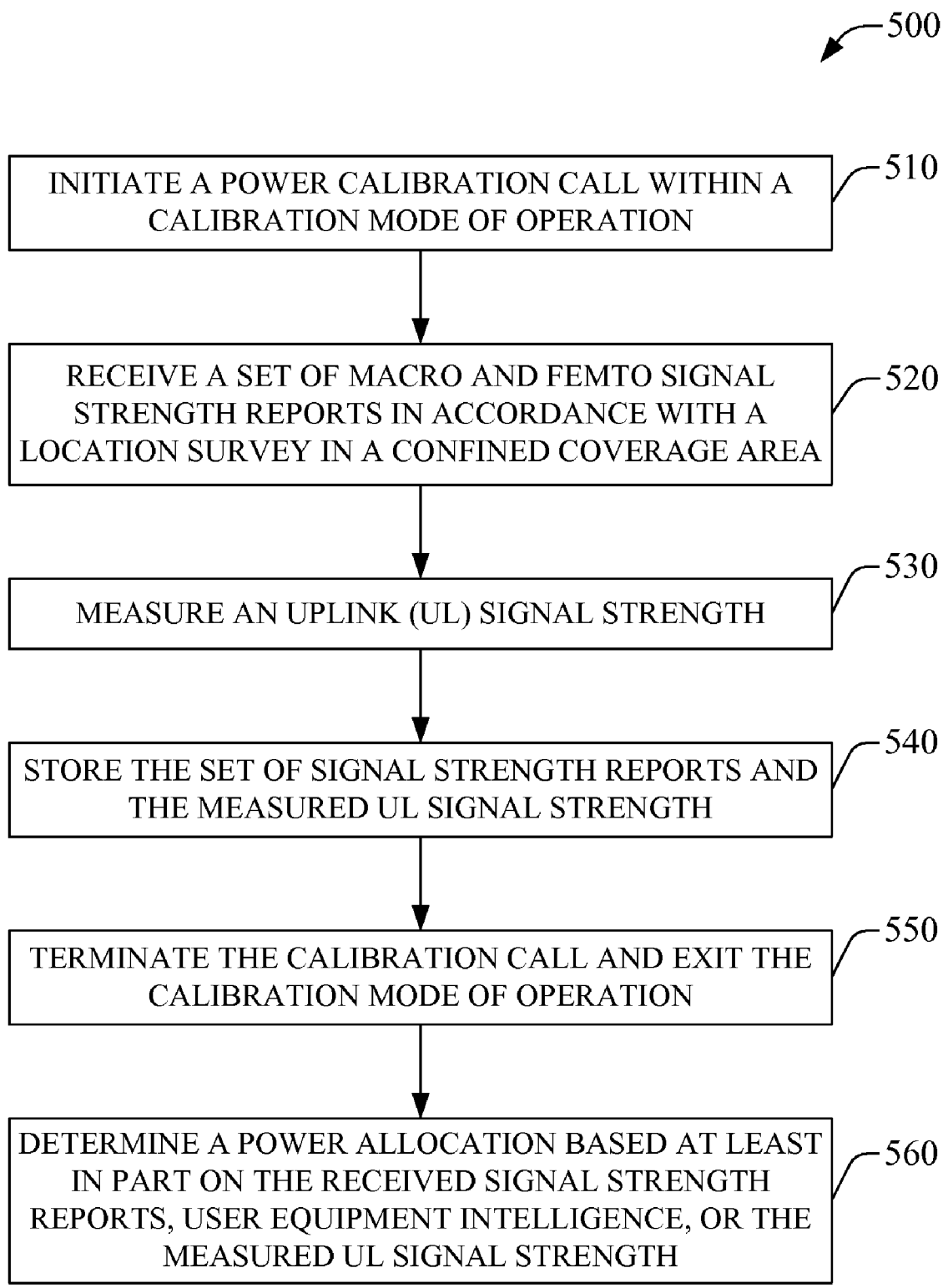
FIG. 5 is a flowchart of an example method for facilitating calibration transmission power of a femto access point according to aspects described herein.

FIG. 5 presents a flowchart of an example method 500 for calibrating transmission power for a femto AP that server a femto cell according to aspects described herein. The femto cell includes a set of confined locations. In an aspect, the subject example method 500 can be carried out, at least in part, by a femto access point (e.g., femto AP 130) or one or more components therein (e.g., power management component 205), or a processor that confers, at least in part, functionality of the femto AP and the one or more components therein. At act 510, a calibration call is initiated within a calibration mode of operation. At act 520, a set of macro and femto signal strength reports in accordance with a location survey in a confined coverage area is received. At act 530, a UL signal strength is measured. In an aspect, the UL signal strength corresponds to a wireless link condition between a femto AP (e.g., femto AP 130) and a UE served by the femto AP. At act 540, the set of signal reports and the measured UL signal are stored. At act 550, the calibration call is terminated and the calibration mode of operation is exited. Termination of the calibration call can be prompted or driven by receiving an indication that the calibration call has been released by a terminal that effectuates, or places, the calibration call.

At act 560, a power allocation is determined based at least in part on the received signal strength reports, user equipment intelligence (e.g., known operational sensitivity(ies)), or measured UL signal strength. In an aspect, signal strength reports can be embodied in codes conveyed through a set of one or more bits in substantially the same, or the same, manner as channel quality indicators (CQI) reports are conveyed in macro networks. In another aspect, as discussed in connection with example system 200 (FIG. 2), the set of available signal strengths can be utilized to generate a set of path losses between an access point and each location associated with each of the signal strength reports, such path losses can be the be combined with target mobile subscriber standard sensitivities and target QoS standards, in order to estimate an optimal power allocation that meets QoS standards and ensures confined femto coverage compatible with surveyed locations, e.g., rooms in a building such as location 1 315$_1$ through location 6 315$_6$.

Figure 6:
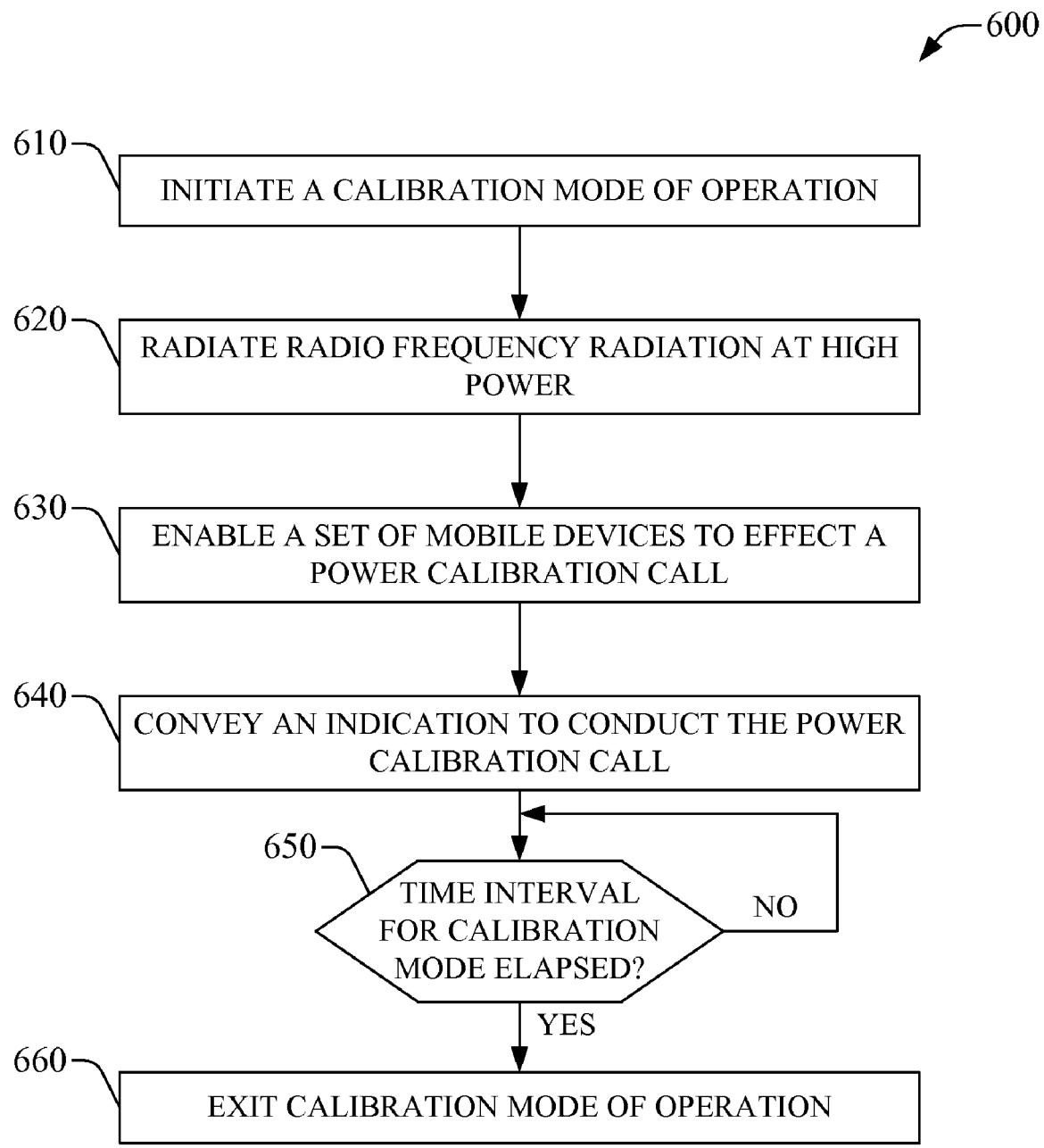
FIG. 6 is a flowchart of an example method for initiating, at least in part, a power calibration call within a calibration mode of operation according to aspects described herein.

FIG. 6 is a flowchart of an example method 600 for initiating, at least in part, a power calibration call within a calibration mode of operation according to aspects described herein. The subject example method 600 can be utilized in conjunction with example method 500. In an aspect, the subject example method 600 can be carried out at least in part by a femto access point (e.g., femto AP 130) or one or more components therein (e.g., power management component 205), or a processor that confers, at least in part, functionality of femto AP or the one or more components therein. At act 610, a calibration mode of operation is initiated. As described above, calibration mode of operation can be initiated according to at least one of an initial power-up for the femto AP being calibrated, a predetermined schedule, or an event based instance such as provisioning, femto AP displacement within a coverage area, or subscriber actuation. Initiation of calibration mode of operation also can include conveying such mode of operation through visual or aural indicia displayed in a display interface associated with the femto AP that is being calibrated, which is the femto AP that enacts the subject example method.

At act 620, radio frequency radiation is radiated at high power. In an aspect, high power can be determined with respect to a regulated or permitted maximum level of power for RF radiation associated with a telecommunication apparatus. In another aspect, high power can be determined with respect to a power level that enables service to devices in high path loss areas, with the power level within the maximum regulated power level. At act 630, a set of mobile devices is enabled to effect a power calibration call; the set can include one or more mobile devices. A mobile device linked to a subscriber for which the femto AP that is being calibrated and is provisioned thereto can be allowed to place a calibration as part of a default protocol of the calibration mode. In an aspect, a unique identifier for the mobile device can be retained in a memory that resides within the femto AP, within a femto gateway node, or within a memory external to either the femto AP or the gateway node.

At act 640, an indication to conduct the power calibration call is conveyed. In an aspect, the indication can be embodied in a communication delivered through at least one of SMS, MMS, IM, or email. In addition, the indication can be delivered as a set of one or more bits conveyed via one or more broadband channels, one or more in-band management frames, or within headers of one or more packets. At act 650, it is evaluated whether a time interval (e.g., $\Delta\tau$ 248) for calibration mode has elapsed. As described above, the time interval can be (i) configured by a network operator or (ii) adjusted upon request from a subscriber that pursues calibration of the transmission power associated with the femto AP that is calibrated; e.g., an elderly subscriber may need a time interval that is longer than that in an initial, network-based configuration.

At act 660, calibration mode of operation is exited. In an aspect, exiting the calibration mode can include shutting down the femto AP that is being calibrated, or conveying termination of operation within calibration mode through visual or aural indicia displayed in a display interface associated with the femto AP that is being calibrated, or enacts the subject example method.

Figure 7:
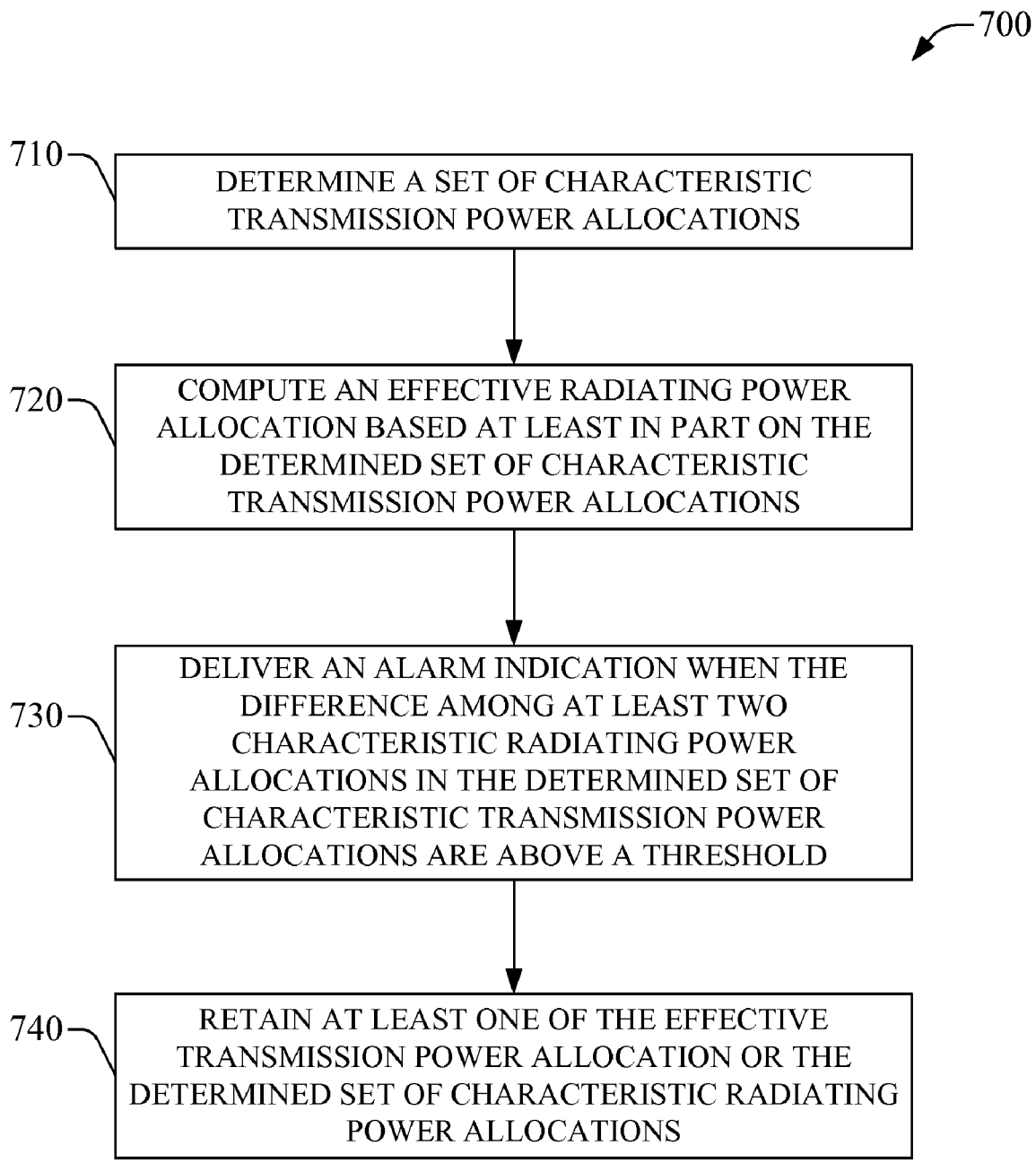
FIG. 7 presents a flowchart of an example method for determining a power allocation based at least in part on received signal strength reports, user equipment intelligence, or measured uplink signal strength according to aspects described herein.

FIG. 7 presents a flowchart of an example method 700 for determining a power allocation based at least in part on received signal strength reports, user equipment intelligence, or measured uplink signal strength according to aspects described herein. The subject example method 700 can be utilized in conjunction with example methods 500 and 600. In an aspect, the subject example method 700 can be carried out at least in part by a femto access point (e.g., femto AP 130) or a component therein (e.g., power management component 205), or a processor that confers, at least in part, functionality to the femto AP or other component. At act 710, a set of characteristic transmission power allocations is determined. In an aspect, determination can proceed as discussed above in connection with example system 200. At act 720, an effective transmission power allocation is computed based at least in part on the determined set of characteristics transmission power allocations. In an aspect, a weighted average of a plurality of transmission power allocations within the set of characteristic power allocations can be computed. In addition, a maximum or minimum value of the characteristic power allocations can be extracted through computations. At act 730, an alarm indication can be delivered when the difference among at least two of the characteristic power allocations in the determined set of characteristic transmission power allocations are above a threshold. In an aspect, the threshold can be determined autonomously based at least in part on historic data associated with differences among two or more of the characteristics power allocations and machine learning methodologies. In another aspect, the threshold can be determined through a network management component (e.g., a femto gateway node, or a radio network controller). At act 740, at least one of the effective transmission power allocation or the determined set of characteristics transmission power allocations is retained. In an aspect, such transmission power allocations can be retained within a memory that resides within the femto AP, within a femto gateway node, or within a memory external to either the femto AP or the gateway node.

Figure 8:
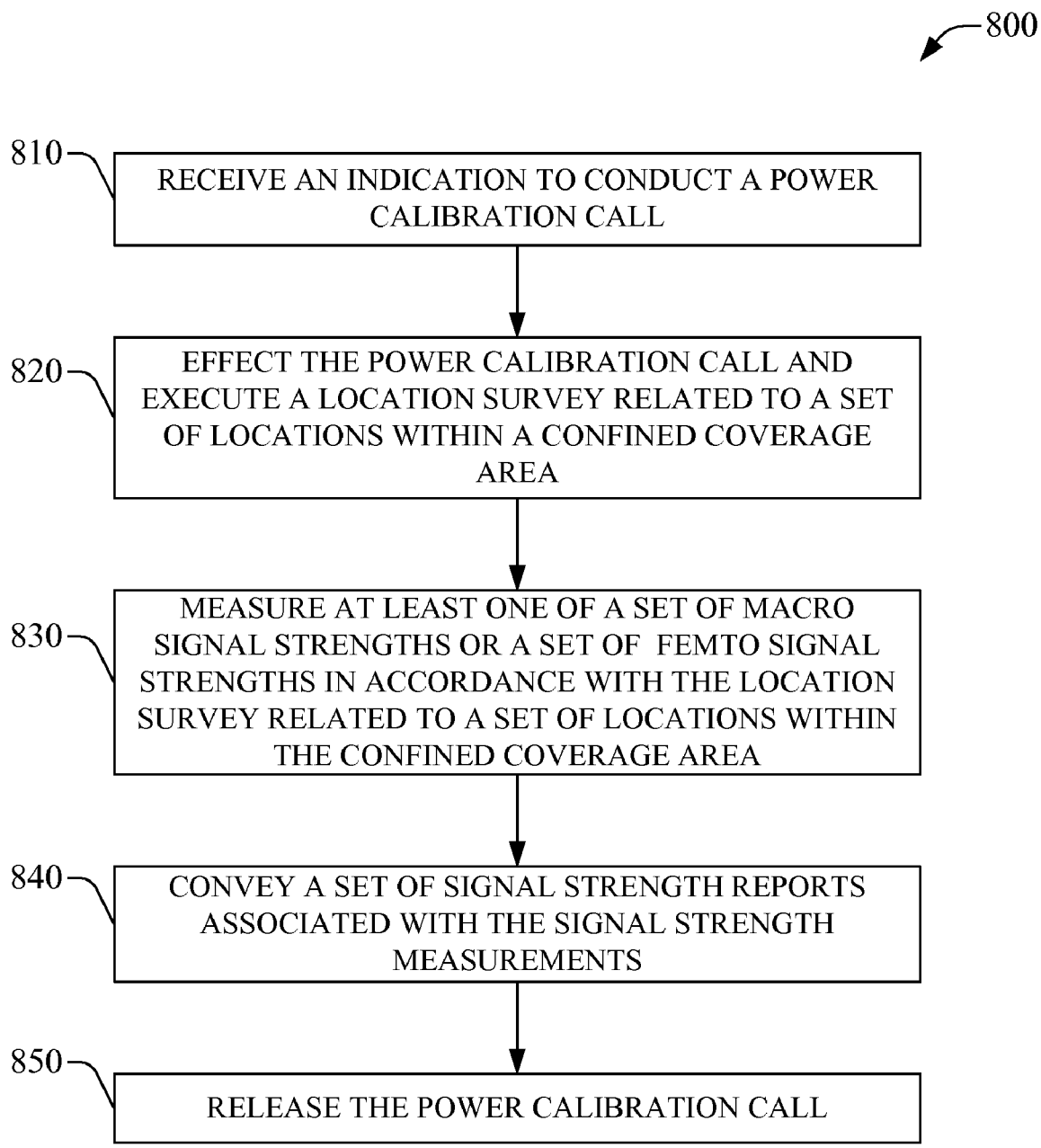
FIG. 8 presents a flowchart of an example method for facilitating calibration transmission power of a femto access point through user equipment and based at least in part on an in-building location survey of macro and femto signals according to aspects described herein.

FIG. 8 is a flowchart of an example method 800 for facilitating calibration transmission power of a femto access point through a user equipment and based at least in part on an in-building location survey of macro and femto signals according to aspects described herein. In an aspect, the subject example method 800 can complement example method 500. In addition, this example method 800 can be carried out by a mobile station (e.g., UE 120), or a processor that confers, at least in part, functionality to the mobile station. At act 810, an indication to conduct a power calibration call, or calibration call, is received. In an aspect, as described above, the indication can be embodied in a communication delivered through at least one of SMS, MMS, IM, or email. In addition, the indication can be delivered as a set of one or more bits conveyed via one or more broadband channels, one or more in-band management frames, or within headers of one or more packets. The indication to conduct a power calibration can provide or convey instruction(s) to a subscriber that operates the mobile device that receives the indication; instructions can include at least one of a predetermined number to call, a time interval to implement the calibration call, a number of locations that can be surveyed as part of the calibration procedure, or an instruction to terminate the call when a subset of locations are surveyed. At act 820, the power calibration call is effected and a location survey related with a set of one or more locations (e.g., locations $1\ 315_1$ through location $6\ 315_6$) within a confined coverage area (e.g., residence 310) is executed.

At act 830, at least one of a set of macro network signal strengths or a set of femto network signal strengths is measured in accordance with the executed location survey related to the set of one or more locations within the confined coverage area. In an aspect, the confined area is served by a femto access point (e.g., femto AP 130), and can correspond to a building (e.g., residence 310) with various locations, e.g., rooms such as locations $1\ 315_1$ through location $6\ 315_6$. Measurements of signal strength, or channel quality, can be performed throughout a building as described above in connection with example embodiment 300. As described above in connection with example system 200, measurements of macro signal strength can include measurement of macro sectors in which femto AP 130 is deployed and neighbor sectors, in which UE 120 can otherwise camp on prior to acquiring femto AP 130.

At act 840, a set of signal strength reports associated with the set of measured signal strengths is conveyed. In an aspect, the reports are conveyed to a femto access point (e.g., femto AP 130) that provides femto service. In another aspect, reports can be embodied in codes conveyed through a set of one or more bits in substantially the same, or the same, manner as CQI reports are conveyed in macro networks. It is noted that the set of bits that can embody signal strength reports can encompass K+P (with K and P natural numbers), wherein K bits can identify a location, e.g., K=3 bits identify up to $2^3=8$ locations, and a set of P bits that convey $2^P$ degrees of signal strength. It is noted that signal strength reports can be delivered through one or more broadband channels, one or more in-band management frames, or within headers of one or more packets.

It is noted that the system(s) and method(s) described herein, and substantially any of their extensions based on aspects disclosed herein, provide at least the following advantages, which are presented herein by way of illustration and not limitation: (a) Service quality. Identification of femto AP (e.g., femto AP 130) radiated power based on a building survey can deliver predictably adequate service quality throughout the building, thus ensuring a rich subscriber experience. (b) Traffic capture. Through optimization of femto AP power based on a building survey, indoor calls can be served on the femto, rather than macro, network, thus ensuring maximum return on investment for a femto cell deployment. (c) Interference and battery life. Ensuring utilization of a minimum necessary power the femto AP is less likely to generate interference or create/capture unnecessary signaling traffic from outside a covered building, or confined coverage area. In addition, minimum power consistent with an adequate coverage can reduce the number of outside users that attempt to access the femto AP via unnecessary transmitter activity, thus ensuring optimal battery life of wireless devices served by and nearby the femto cell.

Figure 9:
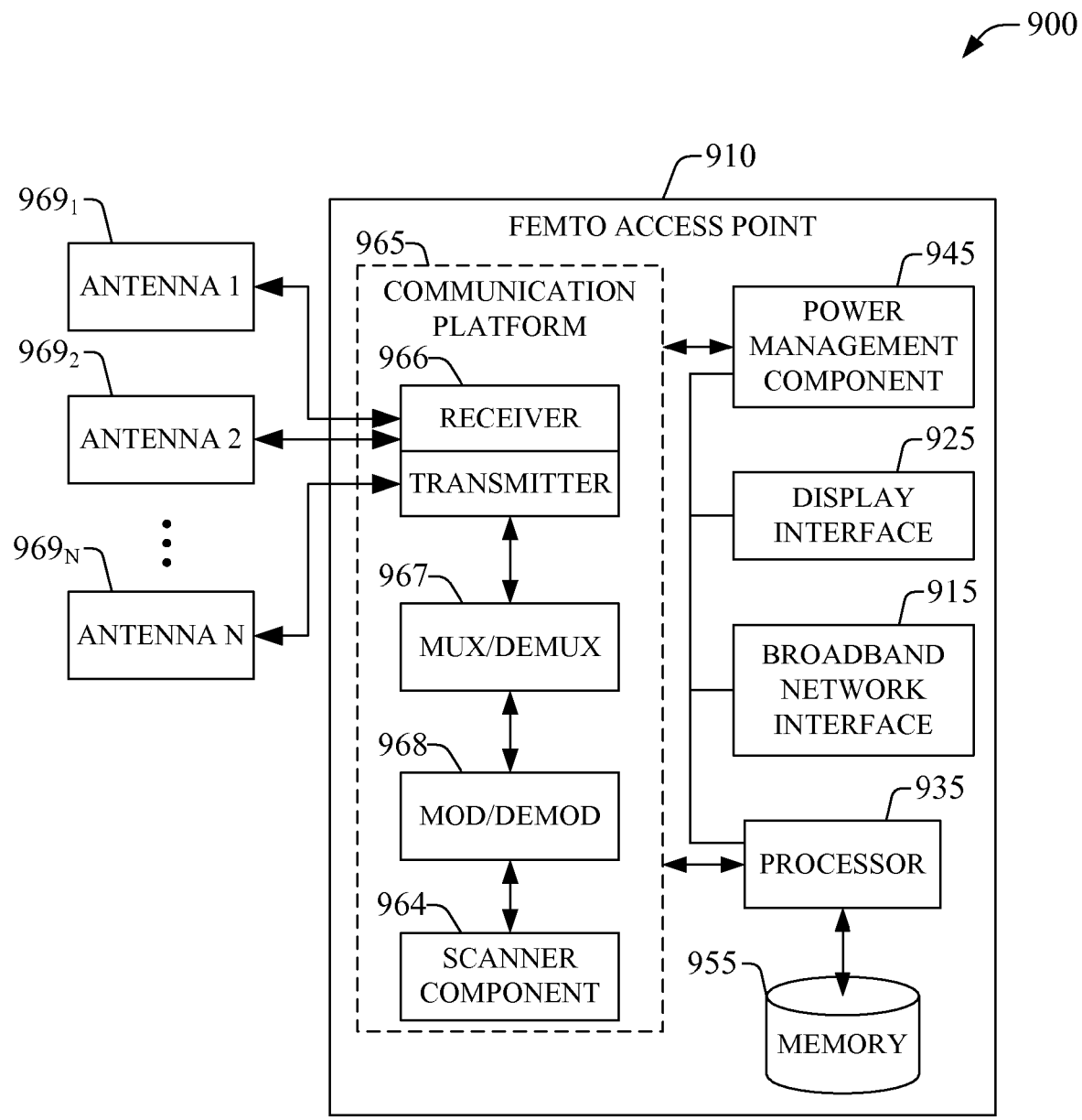
FIG. 9 is a block diagram of an example femto access point that operates in accordance with aspects disclosed in the subject specification.
Figure 10:
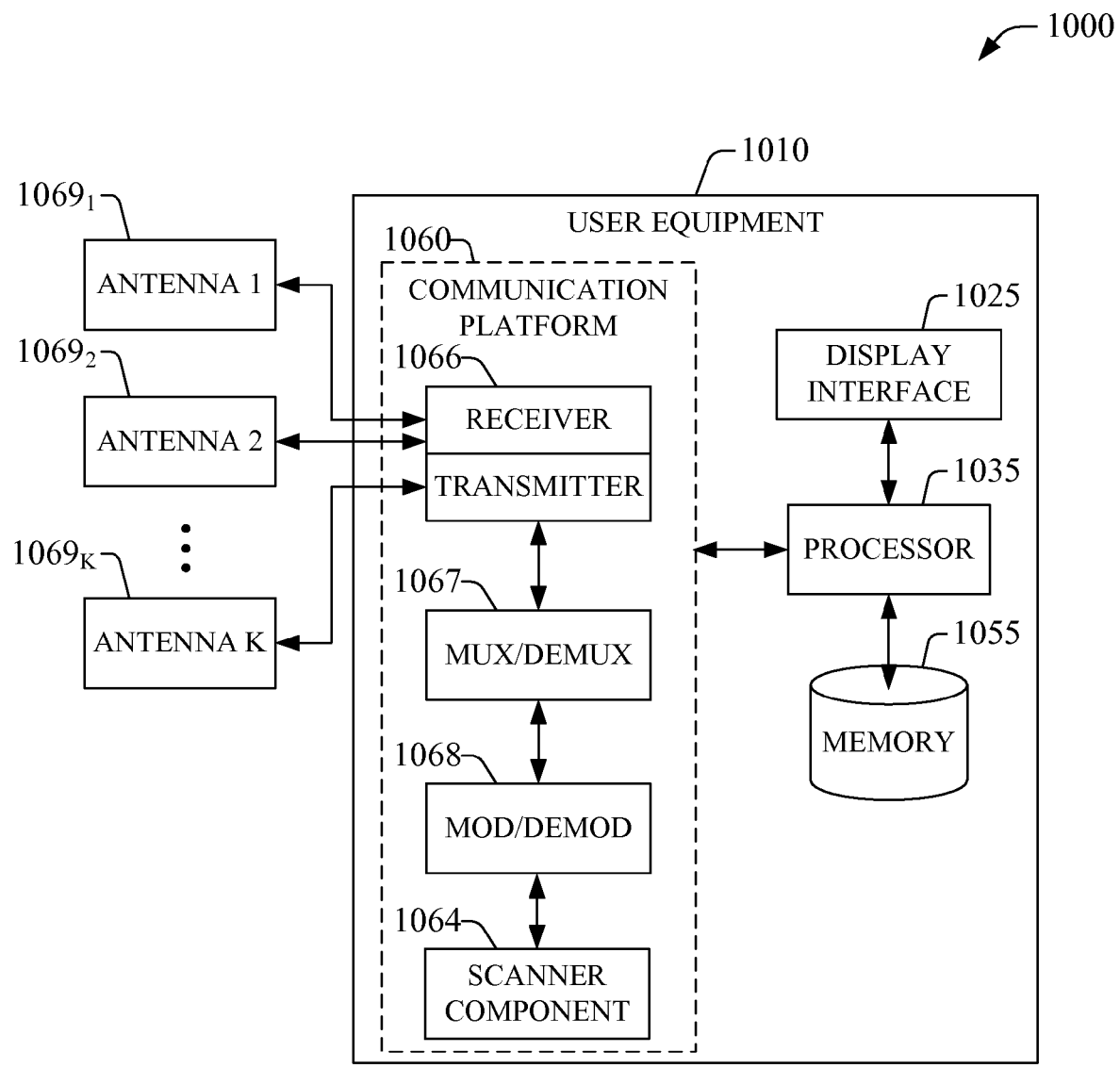
FIG. 10 is a block diagram of an example of user equipment that operates in accordance with aspects disclosed in the subject specification.
Figure 11:
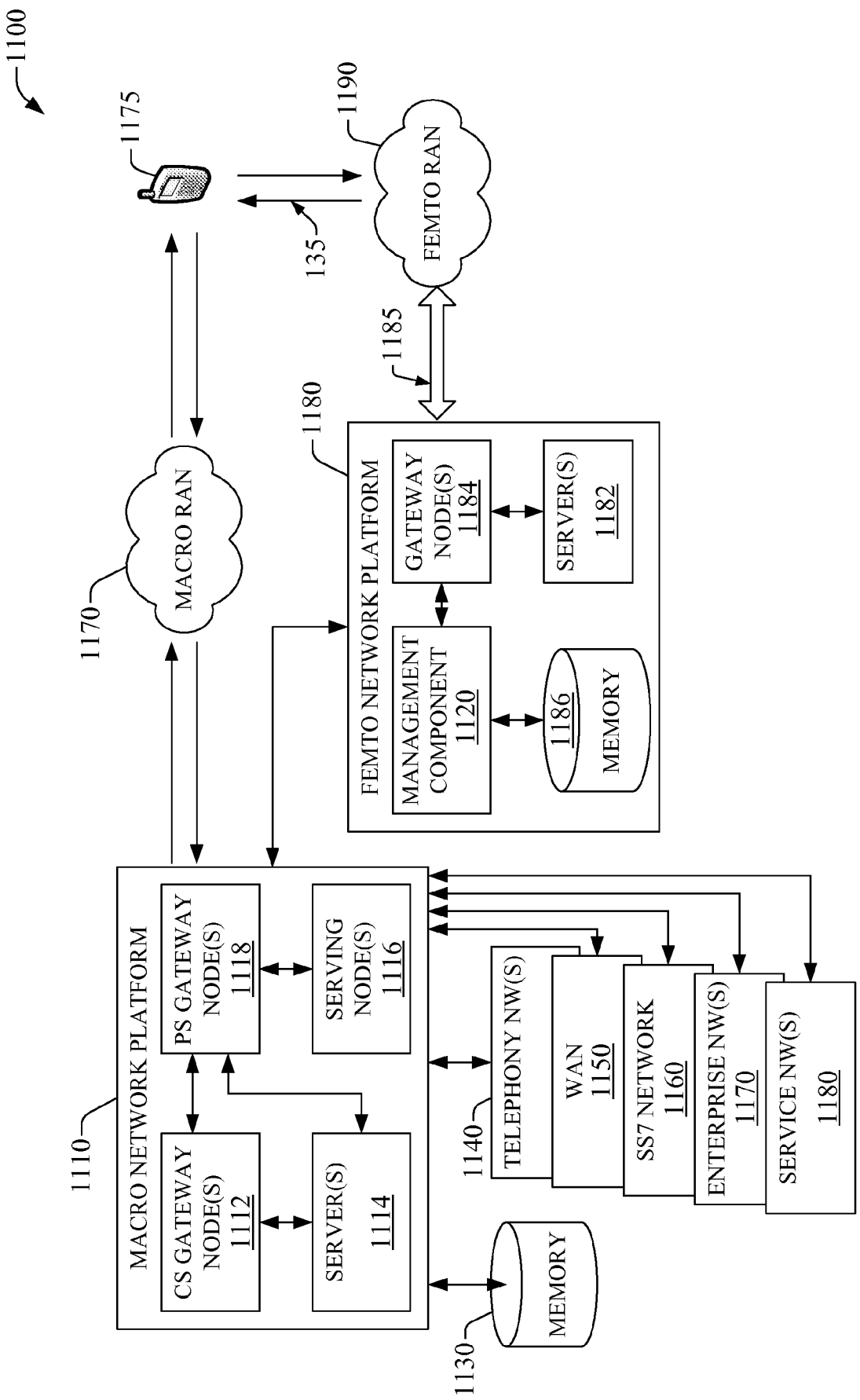
FIG. 11 illustrates a block diagram of an example macro and femto wireless network environments that can exploit femto APs and mobile device(s) for calibration of transmission power for the femto APs in accordance with aspects of the subject innovation.

To provide further context for various aspects of the subject specification, FIGS. 9, 10 and 11 illustrate, respectively, a block diagram of an example embodiment 900 of a femto cell access point that can enable and exploit features or aspects of the subject innovation, a block diagram of an example embodiment 1000 of a user equipment that can enable and exploit building survey for power calibration, or management, in accordance with aspects described herein, and a block diagram of example macro and femto wireless network environment 1100, and associated components, for operation of a femto cell (e.g., femto cell 125) in accordance with various aspects of the specification.

With respect to FIG. 9, in embodiment 900, femto AP 910 can receive and transmit signal(s) from and to wireless devices like macro access points, access terminals, wireless ports and routers, and the like, through a set of antennas $969_1$-$969_N$ (with N a positive integer). It should be appreciated that while antennas $969_1$-$969_N$ are a part of communication platform 965, which comprises electronic components and associated circuitry that provides for processing and manipulation of received signal(s) and signal(s) to be transmitted. In an aspect, communication platform includes a receiver/transmitter 966 that can convert signal from analog to digital upon reception, and from digital to analog upon transmission. In addition, receiver/transmitter 166 can divide a single data stream into multiple, parallel data streams, or perform the reciprocal operation. Coupled to receiver/transmitter 966 is a multiplexer/demultiplexer 967 that facilitates manipulation of signal in time and frequency space. Electronic component 967 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 967 can scramble and spread information (e.g., codes) according to substantially any code known in the art; e.g., Hadamard-Walsh codes, Baker codes, Kasami codes, polyphase codes, and so on. A modulator/demodulator 968 is also a part of operational group 965, and can modulate information according to substantially any modulation technique, such as frequency modulation, amplitude modulation (e.g., M-ary quadrature amplitude modulation (QAM), with M a positive integer), phase-shift keying (PSK), and the like. Communication platform 965 also includes a scanner component 964 that can effect measurements and other analysis on received wireless signal(s). In an aspect, receiver/transceiver 966 and antenna 1 $969_1$-antenna K $969_K$ can embody antenna(s) component 217. Mux/demux component 967, mod/demod component 968, and scanner component 964 can embody detection component 219.

Femto access point 910 also includes a processor 935 configured to confer functionality, at least partially, to substantially any electronic component in the femto access point 910. In addition, processor 935 can facilitate operations on data (e.g., symbols, bits, or chips) for multiplexing/demultiplexing, such as effecting direct and inverse fast Fourier transforms, selection of modulation rates, selection of data packet formats, inter-packet times, etc. A memory 955 can store data structures, code instructions, system or device information, code sequences for scrambling, spreading and pilot transmission, floor plan configuration, access point deployment and frequency plans, scheduling policies, and so on.

Additionally, femto AP 910 can include power management component 445, which operates in the same manner as power management component 205. Power management component 945 can include an analysis component (not shown) and an alarm component (not shown) which can operate in accordance with aspects described herein. It is noted that power management component 945 is functionally connected to processor 935 through a bus.

Moreover, femto AP 910 includes display interface 925, which can display functions that control functionality of femto AP 910, or reveal operation conditions thereof (e.g., light-emitting-diode (LED) indicator(s) that convey a calibration mode of operation, or a number for a power calibration call). In addition, display interface 925 can include a screen to convey information to an end user. In an aspect, display interface 925 can be a liquid crystal display (LCD), a plasma panel, a monolithic thin-film based electrochromic display, and so on. Moreover, display interface can also include a component (e.g., speaker(s)) that facilitates communication of aural indicia, which can also be employed in connection with messages that convey operational instructions to an end user, such as delivery of a calibration call indication (e.g., indication 235). Display interface 925 also can facilitate data entry (e.g., through a linked keypad or via touch gestures), which can facilitated femto AP 910 to receive external commands (e.g., restart operation, upload of model(s) and algorithm(s) for computation of path loss parameters, or the like).

Broadband network interface facilitates connection of femto AP 910 to femto network via backhaul link(s) 153 (not shown), which enables incoming and outgoing data flow. Broadband network interface 915 can be internal or external to femto AP 910, and it can utilize display interface 925 for end-user interaction and status information delivery.

In embodiment 900, processor 935 is coupled to memory 955 in order to store and retrieve information necessary to operate and/or confer, at least in part, functionality to communication platform 965, power management component 445, display interface 425, and other component(s) or platform(s) that provide or facilitate aspects of femto access point 910.

Referring to FIG. 10, in embodiment 1000, user equipment 1010 can receive and transmit signal(s) from and to wireless devices like macro and femto access points, wireless ports and routers, and the like, through a set of antennas $1069_1$-$1069_K$ (with K a positive integer). It should be appreciated that while antennas $1069_1$-$1069_K$ are a part of communication platform 240, which comprises electronic components and associated circuitry that provides for processing and manipulation of received signal(s) and signal(s) to be transmitted. In an aspect, communication platform 240 includes a receiver/transmitter 1066 that can convert signal from analog to digital upon reception, and from digital to analog upon transmission. In addition, receiver/transmitter 1066 can divide a single data stream into multiple, parallel data streams, or perform the reciprocal operation. Coupled to receiver/transmitter 1066 is a multiplexer/demultiplexer 1067 that facilitates manipulation of signal in time and frequency space. Electronic component 1067 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1067 can scramble and spread information (e.g., codes) according to substantially any code known in the art; e.g., Hadamard-Walsh codes, Baker codes, Kasami codes, polyphase codes, and so on. A modulator/demodulator 1068 is also a part of operational group 1060, and can modulate information according to substantially any modulation technique, such as frequency modulation, amplitude modulation (e.g., P-ary quadrature amplitude modulation (QAM), with P a positive integer), phase-shift keying (PSK), and the like. Communication platform 1060 also includes a scanner component 1064 that can effect measurements and other analysis on received wireless signal(s). In an aspect, receiver/transceiver 1066 and antenna 1 $1069_1$-antenna K $1069_K$ can embody antenna(s) component 242. Mux/demux component 1067, mod/demod component 1068, and scanner component 1064 can embody detection component 244.

User equipment 1010 also includes a processor 1035 configured to confer, and that confers, at least in part, functionality to substantially any or any electronic component in UE 1010. In particular, processor 1035 can facilitate signaling-triggered power adjustment associated with communication platform 1060 in accordance to aspects disclosed herein. In addition, processor 1035 can facilitate operations on data (e.g., symbols, bits, or chips) for multiplexing/demultiplexing, such as effecting direct and inverse fast Fourier transforms, selection of modulation rates, selection of data packet formats, inter-packet times, etc. A memory 1055 can store data structures, code instructions, system or device information, code sequences for scrambling, spreading and pilot transmission, floor plan configuration, access point deployment and frequency plans, scheduling policies, and so on.

User equipment 1010 includes display interface 1025, which can display content(s) and indicator(s) that control functionality of UE 1010, or reveal operation conditions thereof (e.g., visual or aural indicia that conveys a calibration mode of operation, number for a power calibration call, signal strength and so forth). Display interface 1025 includes a screen to convey information to an end user. In an aspect, display interface 1025 can be a liquid crystal display (LCD), a plasma panel, a monolithic thin-film based electrochromic display, and so on. Moreover, display interface can also include a component (e.g., speaker(s)) that facilitates communication of aural indicia, which can also be employed in connection with messages that convey operational instructions to an end user, such as delivery of a calibration call indication (e.g., indication 235). Display interface 1025 also can facilitate data entry (e.g., through a linked keypad or via touch gestures), which can facilitate UE 1010 to receive external directive(s), e.g., place calibration call, release calibration call.

In embodiment 1000, processor 1034 is coupled to the memory 1055 in order to store and retrieve information necessary to operate and/or confer functionality to communication platform 1060, and component(s) therein, and other aspects of user equipment 1010.

With respect to FIG. 11, wireless communication environment 1100 includes two wireless network platforms: (i) A macro network platform 1110 which serves, or facilitates communication with user equipment 1175 (e.g., mobile 120) via a macro radio access network (RAN) 1170. It should be appreciated that in cellular wireless technologies (e.g., 3GPP UMTS, HSPA, 3GPP LTE, 3GPP2 UMB), macro network platform 1110 is embodied in a Core Network. (ii) A femto network platform 1180, which can provide communication with UE 1175 through a femto RAN 1190, which is linked to the femto network platform 1180 via backhaul pipe(s) 1185 (e.g., backhaul link(s) 140). It should be appreciated that macro network platform 1110 typically hands off UE 1175 to femto network platform 1110 once UE 1175 attaches (e.g., through macro-to-femto handover) to femto RAN 1190, which includes a set of deployed femto APs (e.g., femto AP 130) that can operate in accordance with aspects described herein.

It is noted that RAN includes base station(s), or access point(s), and its associated electronic circuitry and deployment site(s), in addition to a wireless radio link operated in accordance with the base station(s). Accordingly, macro RAN 1170 can comprise various coverage cells like cell 105, while femto RAN 1190 can comprise multiple femto cell access points such as femto AP 130. Deployment density in femto RAN 1190 is substantially higher than in macro RAN 1170.

Generally, both macro and femto network platforms 1110 and 1180 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 1110 includes CS gateway node(s) 1112 which can interface CS traffic received from legacy networks like telephony network(s) 1140 (e.g., public switched telephone network (PSTN), or public land mobile network (PLMN)) or a SS7 network 1160. Circuit switched gateway 1112 can authorize and authenticate traffic (e.g., voice) arising from such networks. Additionally, CS gateway 1112 can access mobility, or roaming, data generated through SS7 network 1160; for instance, mobility data stored in a VLR, which can reside in memory 1130. Moreover, CS gateway node(s) 1112 interfaces CS-based traffic and signaling and gateway node(s) 1118. As an example, in a 3GPP UMTS network, PS gateway node(s) 1118 can be embodied in gateway GPRS support node(s) (GGSN).

In addition to receiving and processing CS-switched traffic and signaling, PS gateway node(s) 1118 can authorize and authenticate PS-based data sessions with served (e.g., through macro RAN) wireless devices. Data sessions can include traffic exchange with networks external to the macro network platform 1110, like wide area network(s) (WANs) 1150, enterprise networks (NW(s)) 1170 (e.g., enhanced 911), or service NW(s) 1180 like IP multimedia subsystem (IMS); it should be appreciated that local area network(s) (LANs), which may be a part of enterprise NW(s), can also be interfaced with macro network platform 1110 through PS gateway node(s) 1118. Packet-switched gateway node(s) 1118 generates packet data contexts when a data session is established. To that end, in an aspect, PS gateway node(s) 1118 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 1114. It is to be noted that in 3GPP UMTS network(s), gateway node(s) 1018 (e.g., GGSN) and tunnel interface (e.g., TTG) comprise a packet data gateway (PDG).

Macro network platform 1110 also includes serving node(s) 1116 that convey the various packetized flows of information, or data streams, received through PS gateway node(s) 1118. As an example, in a 3GPP UMTS network, serving node(s) can be embodied in serving GPRS support node(s) (SGSN).

As indicated above, server(s) 1114 in macro network platform 1110 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 1110. Data streams can be conveyed to PS gateway node(s) 1118 for authorization/authentication and initiation of a data session, and to serving node(s) 1116 for communication thereafter. Server(s) 1114 can also effect security (e.g., implement one or more firewalls) of macro network platform 1110 to ensure network's operation and data integrity in addition to authorization and authentication procedures that CS gateway node(s) 1112 and PS gateway node(s) 1118 can enact. Moreover, server(s) 1114 can provision services from external network(s), e.g., WAN 1150, or Global Positioning System (GPS) network(s), which can be a part of enterprise NW(s) 1180. It is to be noted that server(s) 1114 can include one or more processor configured to confer at least in part the functionality of macro network platform 1110. To that end, the one or more processor can execute code instructions stored in memory 1130, for example.

In example wireless environment 1100, memory 1130 stores information related to operation of macro network platform 1110. Information can include business data associated with subscribers; market plans and strategies, e.g., promotional campaigns, business partnerships; operational data for mobile devices served through macro network platform; service and privacy policies; end-user service logs for law enforcement; and so forth. Memory 1130 can also store information from at least one of telephony network(s) 1140, WAN 1150, SS7 network 1160, enterprise NW(s) 1170, or service NW(s) 1180.

Regarding femto network platform 1180, it includes a femto gateway node(s) 1184, which have substantially the same functionality as PS gateway node(s) 1118. Additionally, femto gateway node(s) 1184 can also include substantially all functionality of serving node(s) 1116. Disparate gateway node(s) 1184 can control or operate disparate sets of deployed femto APs, which can be a part of femto RAN 1190. In an aspect of the subject innovation, femto gateway node(s) 1184 can aggregate operational data received from deployed femto APs. Moreover, femto gateway node(s) 1184, can convey received attachment signaling to attachment component 1120. It should be appreciated that while attachment component is illustrated as external to gateway node(s) 1184, attachment component 1120 can be an integral part of gateway node(s) 1184.

Management component 1120 can facilitate implementation of calibration call through a femto AP that operates in calibration mode. In an aspect, the calibration call can be received through the femto AP, relayed to femto network platform 1180, and established (e.g., RAB assigned and PDP created) through gateway node(s) 1184 and management component 1120. Calibration call can be served at least in part through server(s) 1182, which can supplement signaling conveyed through the calibrated femto AP to the mobile that places the call (e.g., mobile 1175). Management component 1120 also can receive alarm(s) indication 410 when such alarm indication is directed to a network component (see, e.g., FIG. 4 and associated description), and process, at least in part, such indication to be delivered to an intended recipient, e.g., a network administrator or agent such as customer service support.

Memory 1186 can retain additional information relevant to operation of the various components of femto network platform 1180. For example operational information that can be stored in memory 1186 can comprise, but is not limited to, subscriber intelligence; contracted services; maintenance and service records; femto cell configuration (e.g., devices served through femto RAN 1190; authorized subscribers associated with one or more deployed femto APs); service policies and specifications; privacy policies; add-on features; so forth.

Server(s) 1182 have substantially the same functionality as described in connection with server(s) 1114. In an aspect, server(s) 1182 can execute multiple application(s) that provide service (e.g., voice and data) to wireless devices served through femto RAN 1190. Server(s) 1182 can also provide security features to femto network platform. In addition, server(s) 1182 can manage (e.g., schedule, queue, format . . . ) substantially all packetized flows (e.g., internet protocol (IP)-based, frame relay-based, ATM-based) it generates in addition to data received from macro network platform 1110. Furthermore, server(s) 1182 can effect provisioning of femto cell service, and effect operations and maintenance. It is to be noted that server(s) 1182 can include one or more processors configured to provide at least in part the functionality of femto network platform 1180. To that end, the one or more processors can execute code instructions stored in memory 1186, for example.

Various aspects or features described herein may be implemented as a method, apparatus, or article of manufacture using standard programming and/or engineering techniques. Implementation(s) that include method(s), software or firmware can be implemented at least in part through program modules stored in a memory and executed by a processor and/or other combination of hardware and software or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disc (CD), digital versatile disc (DVD), Bluray Disc (BD) . . . ], smart cards, and flash memory devices (e.g., card, stick, key drive . . . ).

It should be appreciated that while various aspects, features, or advantages described herein have been illustrated through femto access point(s) and associated femto coverage, such aspects and features also can be exploited for home access point(s) that provide wireless coverage through substantially any, or any, disparate telecommunication technologies, such as for example Wi-Fi (wireless fidelity). Additionally, aspects, features, or advantages of the subject innovation described the subject specification can be exploited in substantially any wireless communication technology, in connection with access point power management. For instance, Wi-Fi, WiMAX, EDGE, 3GPP LTE, 3GPP2 UMB, 3GPP UMTS, High-Speed Packet Access, or Zigbee. Additionally, substantially all aspects of the subject innovation as disclosed in the subject specification can be exploited in legacy telecommunication technologies such as GSM.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, the term "memory" refers to data stores, algorithm stores, and substantially any other information store relevant to operation and functionality of a component comprising the memory; for instance, such information can comprise, but is not limited to comprising, subscriber information, femto cell configuration (e.g., devices served by a femto AP), location identifiers, and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the terms "includes," "has," "possesses," and the like are used in either the detailed description or the claims, such term is intended to be inclusive in a manner similar to the term "comprising" as "comprising" is interpreted when employed as a transitional word in a claim.

What is claimed is:

1. A system that allocates transmission power for a home access point (HAP) through a location survey of wireless signal strengths, the system comprising:
a component that initiates a power calibration call;

a component that receives a set of macro and HAP-served signal strength reports according to a location survey in a confined coverage area;

a component that measures an uplink (UL) signal strength; and a power management component that allocates power based at least in part on the received set of signal strength reports and the measured UL signal strength.

2. The system of claim 1, wherein the HAP-served signal includes at least one of a femto coverage signal or a Wi-Fi coverage signal.

3. The system of claim 1, wherein the component that initiates the power calibration call configures the home access point in calibration mode.

4. The system of claim 3, wherein configuration in calibration mode is based at least in part on at least one of an initial power-up of the home access point, a predetermined schedule, or an event based instance.

5. The system of claim 1, wherein the component that initiates the power calibration call conveys a calibration call indication.

6. The system of claim 5, wherein the calibration call indication is a communication delivered through at least one of short message service, multimedia message service, instant messaging, or email.

7. The system of claim 6, wherein the calibration call indication is conveyed through one or more broadband channels, one or more in-band management frames, or within headers of one or more packets.

8. The system of claim 7, wherein the calibration call indication provides instruction(s) to a subscriber that operates a mobile device that receives the indication.

9. The system of claim 8, wherein the instruction(s) includes at least one of a predetermined number to call, a time interval to implement the calibration call, a number of locations that can be surveyed as part of the calibration procedure, or an instruction to terminate the call when a subset of locations are surveyed.

10. The system of claim 1, wherein the signal strength reports include one or more sets of bits, a first subset of bits in the one or more sets of bits identifies a location and a second subset of bits in the one or more sets of bits conveys degrees of signal strength.

11. The system of claim 1, wherein the power management component further computes a set of path loss parameters among the home access point and each location within the location survey.

12. The system of claim 11, wherein the power management component determines a set of characteristic transmission power allocations, the set includes at least a first power allocation value that ensures adequate service throughout the coverage area and a second power allocation values adequate to capture indoor traffic on the home access point instead of macro cell.

13. The system of claim 12, wherein the component that allocates power based at least in part on the received set of signal strength reports and the measured UL signal strength further computes an effective transmission power allocation for the home access point based at least in part on the determined set of characteristic transmission power allocations.

14. The system of claim 13, the power management component further computes an effective power allocation for the home access point, the effective power allocation is one of the maximum of the first and second power allocation values, the minimum among the first and second power allocation values, or a weighted average of the first and second power allocation values.

15. The system of claim 14, further comprising an alarm component that triggers an alarm indication when at least the difference among the first and second power allocation is above a threshold.

16. The system of claim 15, wherein the alarm indication is delivered to at least one of a mobile device, a mobile network platform, or a component within the home access point.

17. The system of claim 16, wherein the alarm indication includes at least one of a visual, aural, or vibration indicia; a short message service (SMS) communication, a multimedia message service (MMS) communication; or a customer-service based voice communication.

18. A method for allocating power to a femto access point through a location survey of wireless signals, the method comprising:

initiating a power calibration call;

receiving a set of macro and femto signal strength reports according to a location survey in a confined coverage area;

measuring an uplink (UL) signal strength;

after terminating the calibration call, determining a power allocation based at least in part on the received set of signal strength reports and the measured UL signal strength.

19. The method of claim 18, wherein the location survey comprises a set of rooms inside a building provided wireless service via the femto access point.

20. The method of claim 18, initiating the power calibration call further comprising:

initiating a calibration mode of operation;

enabling a set of mobile devices to effect a power calibration call; and conveying an indication to conduct the power calibration call.

21. The method of claim 20, further comprising radiating radio frequency radiation at high power, wherein the high power is determined by a regulated maximum value for radiated power from a telecommunications apparatus.

22. The method of claim 20, further comprising exiting calibration mode of operation when a time interval allotted thereto elapses.

23. The method of claim 18, wherein determining a power allocation based at least in part on the received set of signal strength reports and the measured UL signal strength includes:

determining a set of characteristic transmission power allocations; and computing an effective transmission power allocation for the femto access point based at least in part on the determined set of characteristic transmission power allocations.

24. The method of claim 23, further comprising delivering an alarm when the difference among at least two characteristic transmission power allocations in the determined set of characteristic transmission power allocations is above a threshold.

25. The method of claim 24, wherein the alarm indication is delivered to at least one of a mobile device, a mobile network platform, or a component within the femto access point.

26. The method of claim 25, wherein the alarm indication includes at least one of a visual, aural, or vibration indicia; a short message service (SMS) communication, a multimedia message service (MMS) communication; or a customer-service based voice communication.

27. The method of claim 23, further comprising retaining at least one of the effective transmission power allocation or the set of characteristic transmission power allocations; wherein the transmission power allocations are retained within a memory that resides in one or more of the femto access point, a femto gateway node, or a memory external to either the femto access point.

28. The method of claim 23, wherein determining the set of characteristic transmission power allocations further comprises determining a set of path losses among the femto access point and a set of surveyed locations within the location survey.

29. The method of claim 18, further comprising storing the set of signal strength reports and the measured UL signal strength.

30. A non-transitory computer-readable medium having instructions stored thereon that, when executed by a processor, cause a computer to perform the following acts:
  initiating a power calibration call;
  receiving a set of macro and femto signal strength reports according to a location survey in a confined coverage area;
  measuring an uplink (UL) signal strength; and
  determining a power allocation based at least in part on the received set of signal strength reports and the measured UL signal strength.

31. A method comprising:
  receiving an indication to conduct a power calibration call;
  effecting the power calibration call and executing a location survey related to a set of locations within a confined coverage area;
  measuring a set of wireless signal strengths according to the location survey related to the set of location within the confined coverage area; and
  conveying a set of signal strength reports associated with the measured set of wireless signal strengths.

32. The method of claim 31, wherein the wireless signal strength comprises at least one of a macro coverage signal, a femto coverage signal, or a Wi-Fi coverage signal.

33. The method of claim 31, further comprising releasing the power calibration call.

34. The method of claim 31, wherein the indication to conduct the power calibration call is a communication delivered through at least one of short message service, multimedia message service, instant messaging, or email.

35. The method of claim 34, wherein the indication to conduct the power calibration call is conveyed through one or more broadband channels, one or more in-band management frames, or within headers of one or more packets.

36. The method of claim 31, wherein the indication to conduct the power calibration call provides instruction(s) to a subscriber that operates a mobile device that receives the indication.

37. The method of claim 36, wherein the instruction(s) includes at least one of a predetermined number to call, a time interval to implement the calibration call, a number of locations that can be surveyed as part of the calibration procedure, or an instruction to terminate the call when a subset of locations are surveyed.

38. The method of claim 31, wherein the confined coverage area is a building served through a femto access point that is being calibrated.

39. A mobile device, comprising:
  a platform that receives an indication to conduct a calibration call;
  a component that measures at least one of a set of home-access-point-served signal strengths or a set of macro signal strengths via a location survey of a confined coverage area; and
  a component that conveys a set of signal strength reports associated with the measured signal strengths.

40. The mobile device of claim 39, wherein the home-access-point-served signal includes at least one of a femto coverage signal or a Wi-Fi coverage signal.

41. The mobile device of claim 39, wherein the platform conveys an indication to effect the calibration call, and an indication to release the calibration call when the location survey of the confined coverage area is completed.

42. The mobile device of claim 39, further comprising a display interface that conveys the received indication to conduct the calibration call.

43. The mobile device of claim 39, wherein the indication to conduct the calibration call includes at least one of a SMS communication, a MMS communication, an IM communication, or an email communication.

44. The mobile device of claim 39, wherein the signal strength reports include codes a set of bits, a first subset of bits in the set of bits identifies a location and a second subset of bits in the set of bits conveys degrees of signal strength.

45. A non-transitory computer-readable medium having instructions stored thereon that, when executed by a processor, cause a computer to perform the following acts:
  receiving an indication to conduct a power calibration call and effecting the power calibration call;
  measuring a set of wireless signal strength according to a location survey in a confined coverage area;
  conveying a set of signal strength reports associated with the measured wireless signal strength; and
  releasing the power calibration call.

* * * * *